United States Patent [19]
Osborne, deceased et al.

[11] 3,922,349
[45] Nov. 25, 1975

[54] CATTLE FEED TREATED WITH AIR EXPOSED TO ULTRAVIOLET AND HIGH VOLTAGE

[76] Inventor: Charles William Osborne, deceased, late of Pampa, Tex.; Weymar Zack Osborne, executor, 1315 Williston St., Pampa, Tex. 79065

[22] Filed: Oct. 16, 1974

[21] Appl. No.: 515,258

Related U.S. Application Data

[63] Continuation of Ser. No. 381,682, July 23, 1973, abandoned, which is a continuation of Ser. No. 168,759, Aug. 3, 1971, abandoned, which is a continuation-in-part of Ser. No. 73,099, Sept. 17, 1970, abandoned.

[52] U.S. Cl. .......... 426/2; 426/236; 426/248; 426/320; 426/807; 426/52; 426/54; 426/44
[51] Int. Cl.² .......................................... A23L 3/28
[58] Field of Search ....... 426/2, 236, 237, 240, 248, 426/319, 320, 210, 335, 807, 208

[56] References Cited
UNITED STATES PATENTS

| | | | |
|---|---|---|---|
| 759,651 | 5/1904 | Alsop | 426/236 |
| 888,106 | 5/1908 | Mears | 426/319 |
| 1,538,369 | 5/1925 | Akiyama | 426/319 |
| 1,959,390 | 5/1934 | Smith | 99/221 |
| 3,155,525 | 11/1964 | Sakai | 426/236 |
| 3,511,671 | 5/1970 | Miles | 426/319 |

Primary Examiner—Norman Yudkoff
Assistant Examiner—Hiram H. Bernstein

[57] ABSTRACT

Cattle feed composition containing limited amount of nitrate and absence of urea fermenting ability is shown to have beneficial effect on conversion of feed to meat and process for manufacture thereof is described.

5 Claims, 8 Drawing Figures

INVENTOR.
CHARLES W. OSBORNE
BY
Ely Silverman
ATTORNEY

INVENTOR.
CHARLES W. OSBORNE
BY
Ely Silverman
ATTORNEY

INVENTOR.
CHARLES W. OSBORNE
BY
Ely Silverman
ATTORNEY

INVENTOR.
CHARLES W. OSBORNE
BY
Ely Silverman
ATTORNEY

CATTLE FEED TREATED WITH AIR EXPOSED TO ULTRAVIOLET AND HIGH VOLTAGE

CROSS REFERENCE TO RELATED APPLICATION

This is a continuation application of my co-pending application Ser. No. 381,682, filed July 23, 1973, and now abandoned, entitled CATTLE FEED COMPOSITION AND PROCESS OF ITS MANUFACTURE; said application Ser. No. 381,682 is a continuation of application Ser. No. 168,759, filed Aug. 3, 1971, and now abandoned, entitled CATTLE FEED COMPOSITION AND PROCESS OF ITS MANUFACTURE; said application Ser. No. 168,759, was a continuation-in-part of and improvement over my copending application Ser. No. 73,099 filed Sept. 17, 1970, and now abandoned, entitled CATTLE FEED COMPOSITION AND PROCESS OF ITS MANUFACTURE which application in turn was an improvement over the process and new use of the apparatus disclosed in U.S. application Ser. No. 75,415 of Don L. Brunton (filed Sept. 25, 1970 entitled CATTLE FEEDING DEVICE AND PROCESS) and whose rights in regard thereto had been prior to abandonment transferred to the applicant herein.

FIELD OF THE INVENTION

Animal feed treatment and animal feed compositions and animal feeding devices.

DESCRIPTION OF THE PRIOR ART

Nitric oxides are generally described as undesirable in ruminant animal feed (e.g. The Veterinarian, published by Pitman Moore Division of the Dow Chemical Company, July-August 1965, Vol. 37, No. 4, page 115; and U.S. Pat. No. 3,102,780) notwithstanding its known effect on undesirable bacteria (e.g. Clostridea *Handbook of Food and Agriculture*, Reinhold Publishing Company, 1955, page 406).

SUMMARY OF THE INVENTION

I have discovered that, in certain limited amounts, feeds with nitric oxide compounds are beneficial in cattle feed and have developed a useful process for controllably providing such animal feed compositions and also feeds with bacterial flora having urea fermenting properties removed.

DESCRIPTION OF THE EMBODIMENTS

Figure 1:
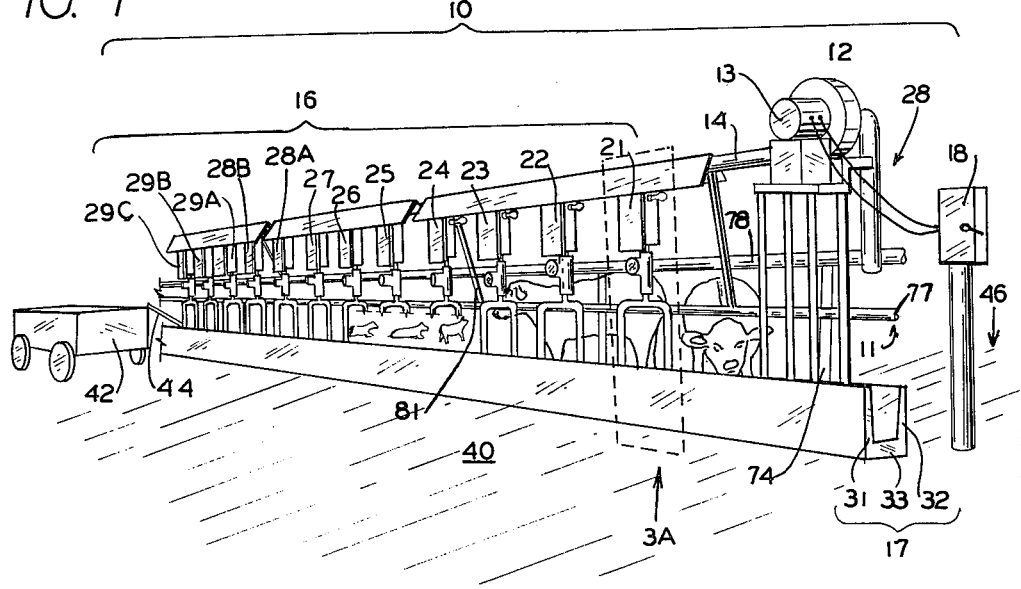
FIG. 1 is a front and side oblique and perspective view of an embodiment of device capable of performing the process of this invention; such apparatus is shown broken away in part.

An apparatus capable of performing the instant process is illustrated in FIGS. 1 through 7 and herebelow described.

One embodiment 10 of apparatus for performing this invention comprises, in operative combination, a frame 11, a fan 12, a motor 13, a duct 14, a station assembly 16, a power source 18, and a trough 17. This apparatus is the same as in the above-referred to application of Don L Brunton.

The apparatus is located in a feed lot 19.

The frame 11 extends horizontally and comprises, in operative combination, a plurality of horizontally spaced apart vertical standards as 74, 74A, 74B, each rigid and firmly fixed at its lower end in the ground, with a plurality of vertically spaced apart horizontally extending rigid beams 77, 78, and 79, and longitudinally spaced apart sets of rigid vertically and diagonally extending members as 80 and 81. The horizontally extending beams 77 and 78 are firmly fixed to the vertical standards as 74, 74A and 74B. The diagonally and vertically extending members as 80 and 81 support the uppermost longitudinal extending rigid horizontal member 79 and are firmly fixed to beams 78 and 79.

The trough 17 comprises a longitudinally and vertically extending front or outer wall 31, a longitudinally and vertically extending rigid rear or inside wall 32, a longitudinally and horizontally extending bottom wall 33, all operatively connected as shown in FIG. 1; these walls surround the bottom and sides of interior trough chamber 34 which is open at its top. In the use of the trough 17 the bottom thereof is filled to varying depths of usually up to about 8 inches with the cattle feed 36. Trough 17 is 30 inches high and 30 inches wide. The duct 14 is a straight cylindrical duct made of rigid plastic and is electrically insulating and is firmly supported by the ridge member 79. The fan 12 is firmly supported at one end of the frame 11 with its outlet at the level of member 79. The frame 11 is located adjacent to inner wall 32 of the trough 17.

The motor 13 is operatively connected to the power source 18 and the motor 13 drives the fan 12. The outlet of the fan 12 and the inlet of the duct 14 are operatively connected. The trough 17 is located between each feedlot pen as 46 and an aisle as 40 in the conventional feedlot 19.

A standard feed truck as 42 moves along the aisle 40 and the discharge trough 44 thereof empties feed into the chamber 34 of the feed trough 17 at regular intervals. usually twice daily, in an evenly distributed manner along the length of the trough 34 between units 21 and 29C.

The station assembly 16 comprises a series of like units 21, 22, 23, 24, 25, 26, 27, 28A, 28B, and 29A, 29B, and 29C, each supported on the frame assembly 11 at its top and each extending into the trough chamber 34 at its bottom.

The units 21 through 29C are mechanically identical; accordingly the description hereinafter given of the structure and operation of the unit 21 is to be understood as applying to all the others 22–29C.

The unit 21 comprises a rigid box 50, a vertical duct 58, a primary electrical circuit 83, a secondary electrical circuit 84, and a gap chamber 85 in operative connection.

The primary circuit 83 comprises, in operative connection, an indicator lamp 51, a fuse 52, and a primary transformer coil 53 connected in series with the power lines 71 and 72 from the electrical power source 18. Each of lines 71 and 72 is a standard insulated electrical conductor extending the full length of duct 14 from the power source 18 to each of the units as 21 through 29C, and is connected to each of the primary circuits as 83 of the units 21 through 29C in parallel electrical circuit and to the 110 volt source 18. Duct 14 is a rigid electrically insulating 6 inch o.d. pipe.

The secondary electrical circuit 84 comprises a secondary coil 54, and sharp discharge points 55 and 56. The secondary coil 54 is operatively connected with the primary coil 53 in conventional manner for primary and secondary coil in 60 cycle A.C. transformers. The secondary circuit points 55 and 56 are firmly yet adjustably located in spaced apart relationship across a gap 57 in the chamber 85. Secondary coil 84 provides 15,000 volts.

The rigid uppermost of ridge bar 79 of the frame assembly 11 is firmly attached to and supports a rigid upper weathertight yet openable box 50 below the duct 14. A lower rigid gap chamber 85 is firmly attached to and supported by the bottom of the box 50.

The primary coil element 53 and the secondary coil 54 are firmly located in the box 50 and supported therefrom by conventional insulators; the vertical duct 58 is an electrically insulating plastic duct the interior of which is operatively connected air-tight at its top with the interior of duct 14 and the walls of which are 4 in. o.d. and firmly attached in an air-tight manner to the walls of duct 14. Duct 58 traverses the box 50 vertically and enters the top of the gap chamber 85. Chamber 85 is a cylindrical electrically insulated chamber with rigid walls provided with a viewing window 60. The walls of chamber 85 enclose and support the electrical points 56 and 55 in spaced apart relationship across the gap space 57. These electrodes 56 and 57 are pointed at their ends and point in the direction of each other. The points 56 and 55 are located interiorly of the window and an adjustment screw 59 is provided in chamber 85 so that the spacing of the points 56 and 57 may be adjusted as desired.

In operation the lamp 51 provides indication that the apparatus as 21 is operative while the fuse 52 provides for protection against flow of an excessive current through the primary coil 53 as might result if an excessive current went through the secondary coil, and automatically provides for a cutoff in event of such excessive power drain. In the particular embodiment shown the transformer provides for an output at the secondary 54 at 15,000 volts of 0.030 AMP (30 milliamperes) and there can be visually observed through the window 60 some glow and a slight hissing sound may be observed during operation of apparatus 10.

The duct 58 extends below the chamber 58 to a rigid inverted tee shaped duct 58A and the same 58B and 58C of the tee connect to vertical duct members 58D and 58E. Members 58D and 58E are rigid insulating plastic ducts with lower orifices 69D and 69E respectively. These orifices are located at a level below the top of the trough and above the bottom of the trough and, more particularly, at a level about 16 inches above the bottom of the trough so that the orifices as 69D and 69E of each unit as 21 will be spaced about 8 inches above the top of the feed 36 located in the trough, when the trough is full with feed to its normal topmost level of such for feed; normally the trough is only partially filled to avoid spillage and wasting of the feed.

Figure 2:
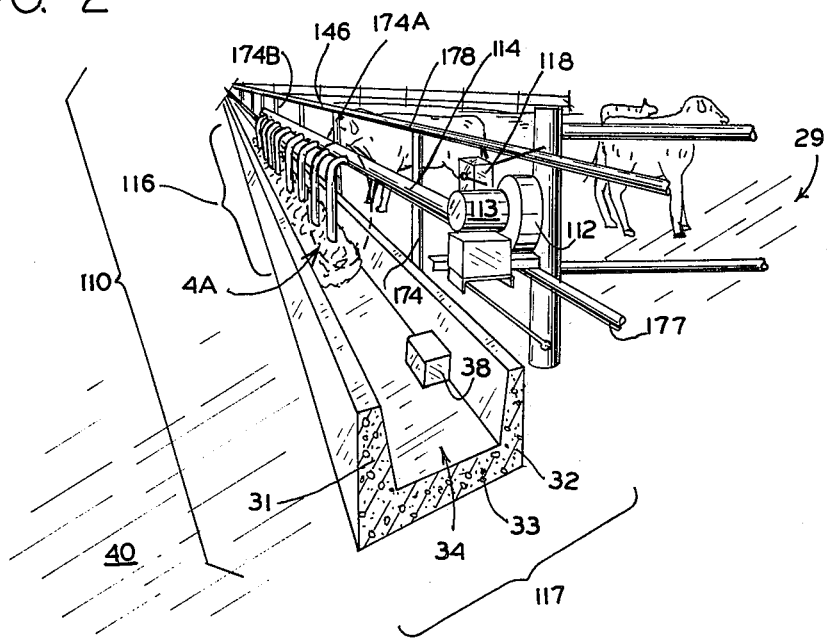
FIG. 2 is a front and side oblique and perspective view of another embodiment of device for performing the process of this invention.

The trough, as 17, is 30 inches wide and 30 inches high and shaped as shown in FIGS. 1 and 2. Each of the outlet tubes, as 58D and 58E is supported in the tee therefor, as 58C, so that the outlet tubes of units 21-29C are evenly spaced (with a center-to-center distance of about 30 inches) along the length of trough chamber 34, fan 13 has a capacity of 325 c.f.m. at 6 p.s.i.; motor 12 is a one-third H.P.motor.

Figure 3:
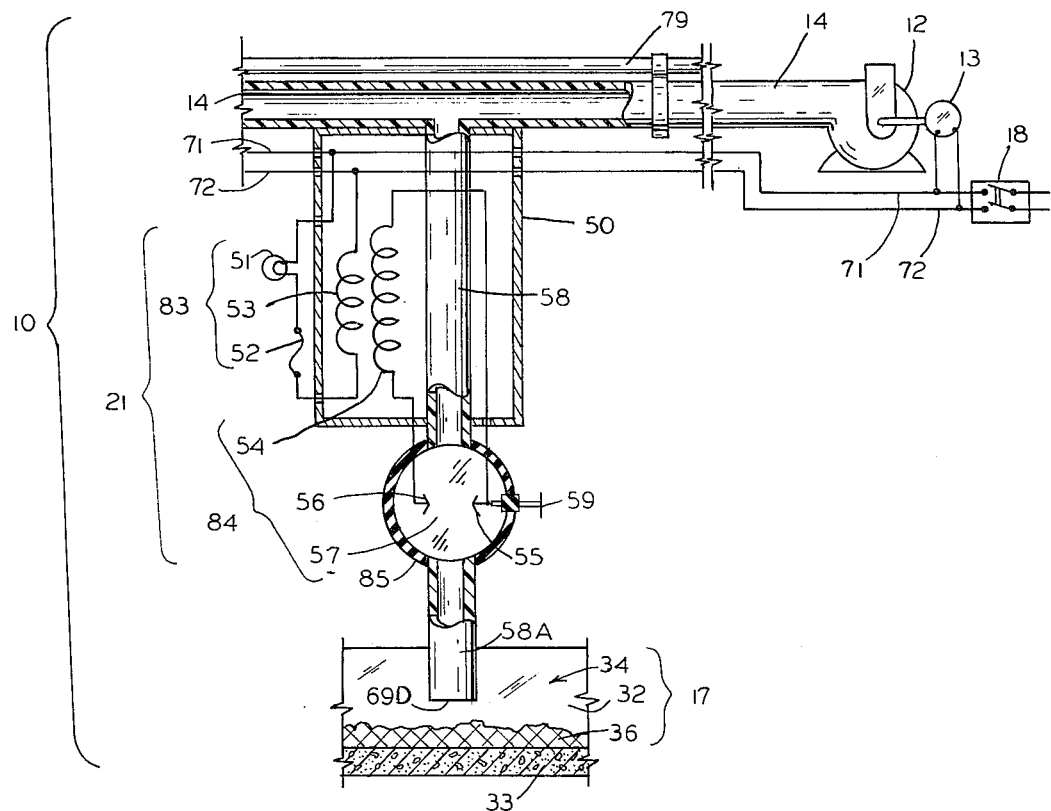
FIG. 3 is a diagrammatic view in zone 3A of FIG. 1.
Figure 4:
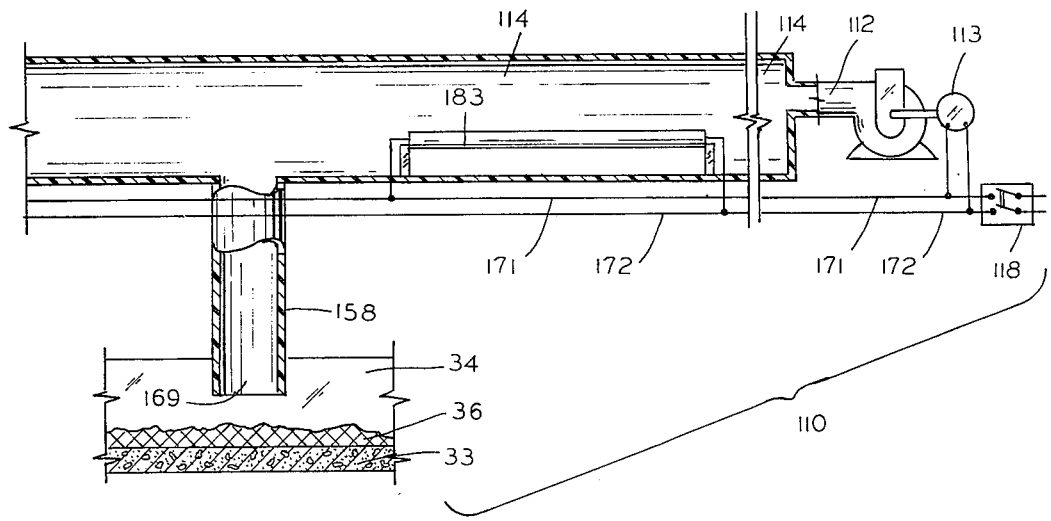
FIG. 4 is a diagrammatic view in zone 4A of FIG. 2.
Figure 5:
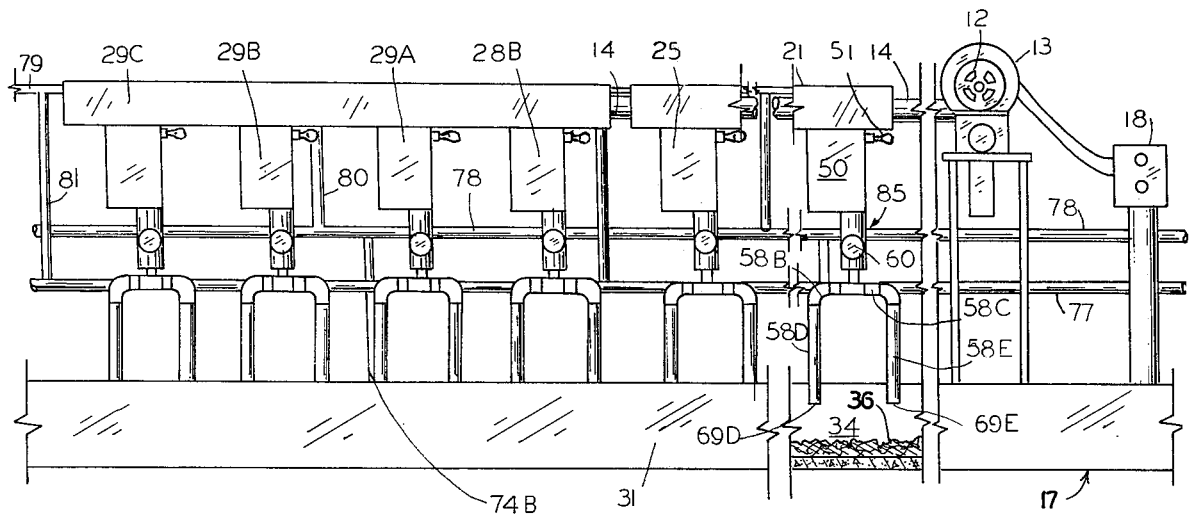
FIG. 5 is a frontal view of the apparatus shown in FIG. 1 in zone 5A thereof.

To facilitate cleaning of these troughs the units as 21 shown in FIGS. 1 and 3 are hingedly or pivotally attachhed to their support, as 79, which support is firmly supported on the ground and a motor may be provided which is actuated by a switch or push button to raise or otherwise move these units to allow the trough 17 to be cleaned mechanically.

The apparatus 110 which is a variant of apparatus 10 comprises, in operative combination, a frame 111, a fan 112, a motor 113, a duct 114, a station assembly 116, a power source 118, and a trough 117. The units 112, 113, 114, 117, 118 of the apparatus 110 are the same in size structure and function as the frame 11, fan 12, motor 13, duct 14, trough 17 and power source 18, respectively, of the apparatus 10. The frame 111 is identical to frame 11 except for the elimination in the frame 111 of elements corresponding to 79, 80 and 81, i.e. the frame 111 comprises, in operative combination, a plurality of horizontally spaced apart rigid vertical standards as 174, 174A, 174B with a plurality of vertically spaced apart rigid horizontally extending lower and upper beams 177, 178, and the duct 114 is firmly attached to and supported on the member 177.

The duct 114 is a straight cylindrical duct of rigid 4 inch o.d. plastic and is electrically insulating and is firmly supported by the member 177. The fan 112 is firmly supported at one end of the frame 111 with its outlet at the level of member 177. The frame 111 is located adjacent to inner wall of the trough 117.

The motor 113 is operatively connected to the power source 118 and the motor 113 drives the fan 112. The outlet of the fan 112 and the inlet of the duct 114 are operatively connected. The trough 117 is located between each feedlot pen as 146 (like 46) and an aisle as 140 in the conventional feedlot 19.

The station assembly 116 comprises a series of like units 121, 122, 123, 124, 125, 126, 127, 128A, 128B, and 129A, 129B, and 129C, each supported on the frame assembly 111 at its top and each extending into the chamber of trough 117 at its bottom.

A standard feed truck as 42 moves along the aisle 40 and the discharge trough 44 thereof empties feed into the chamber 134 of the feed trough 117 at regular intervals, usually twice daily, in an evenly distributed manner along the length of the trough 117 between units 121 and 129C.

The units 121 through 129C are mechanically identical; accordingly the description hereinafter given of the structure and operation of the unit 121 is to be understood as applying to all the others 122-129C.

The unit 121 comprises an ultraviolet radiation producing or germicidal lamp 183 (80 watts, 10 amperes in embodiment 110) operatively connected to power lines 171 and 172, and a plastic duct 158. Each of lines 171 and 172 is a standard insulated electrical conductor extending the full length of duct 114 from the power source 118 to each of the units as 121 through 129C, and is connected to each of the circuits as 183 of the units 21 through 29C in parallel electrical circuit and to the 110 volt source 118. Each lamp element as 183 is firmly located in the duct 114 and supported therein by conventional insulators; the vertical duct 158 is a flexible electrically insulating 3 inch o.d. plastic duct the interior of which is operatively connected air-tight at its top with the interior of the main duct 114 and the walls of which are firmly attached in an air-tight manner to the walls of duct 114. Each duct as 158 has a lower orifice as 169. Each such orifice is located at a level below the top of the trough and above the bottom of the trough 117, and, more particularly at a level about 16 inches above the bottom of the trough so that the orifices as 169 of each unit as 121 will be spaced about 8 inches above the top of the feed 36 located in the trough when the trough is full with feed to its normal topmost level of such for feed; normally the trough is only partially filled to avoid spillage and wasting of the feed.

The trough, as 117, is 30 inches wide and 30 inches high and shaped as shown in FIGS. 1 and 2. Each of the tubes, as 158, is supported to be evenly spaced (with a center-to-center distance of about 30 inches) along the length of trough chamber 34; fan 113 has a capacity of 325 c.f.m. at 6. p.s.i.; motor 112 is a one-third H.P. motor.

TABLE I

103 Day Test 30 Cattle

| Measurements | Pen Number | | |
|---|---|---|---|
| | 28 | 29 | 30 |
| Weight In | 18,000 | 18,165 | 18,630 |
| Out | 29,381 | 29,165 | 29,717 |
| Net Gain | 11,381 | 11,000 | 11,037 |
| Total C.H.D. * | 3,090 | 3,090 | 3 090 |
| Ave. C.H.D. | 103 | 103 | 103 |
| Total lbs. feed | 76,340 | 78,390 | 88,600 |
| Ave. per head | 2,544 | 2,613 | 2,953 |
| Ave. per head per day | 24.6 | 25.3 | 28.6 |
| Cost per lb. of feed | $.025 | $.025 | $.025 |
| Total cost feed | $1920.76 | $1977.79 | $2242.15 |
| Ave. cost per head | $64.02 | $65.92 | $74.73 |
| Ave. cost per lb. | $.168 | $.179 | $.202 |

* Cattle Head Days

OPERATION OF THE APPARATUS

In operation of the apparatus 10 the fan 12 operates to pass air to the bottom orifices as 69D and 69E of each unit as 21. The rate of flow of air is such that with a U-shaped manometer formed of ¼ inch i.d. glass tubing with tap water therein and with the plane of the manometer at a slope of 5° to the horizontal and with one mouth of the manometer pointed directly upstream (into the stream of air passing through duct 58C) through an orifice as 59D, a differential height of the water in the manometer arm of 1 inch is provided, that is there is a very slight breeze, a very slight non-turbulent flow, of air from the duct 14 into the trough.

Also at the discharge orifices a showing of the presence of negative ions was found using an ion chamber as described in *Popular Electronics* November, 1969, pp. 31–35, wherein ions detected by the ion chamber develop a small voltage across a very high resistance (of 100,000 megohm) which small voltage is amplified and operates a transistorized bridge. The ion chamber consists of an outer electrode in the form of a screen cage through which air can flow and an inner electrode in the form of a rod in the center of the cage.

As a means of demonstrating the utility of this apparatus each of three feedlot pens of like size and located adjacent to each other, i.e. pen 28, pen 29, and pen 30 at the Happy Wheat Growers Feedlot, Happy, Tex. were each provided with 30 head of cattle of like description and so far as could be gained by eye, like characteristics. The apparatus of FIG. 1 was applied to pen 28 that of FIG. 2 was applied to pen 29 and pen 30 was used as a control. The figures obtained for measurement of such cattle on a 103 day test (wherein the feed from the same source and with the same content was fed at the same time in the same manner to the troughs in each of such pens are set out in Table I hereinabove. Table I shows for instance the net gain (as well as weight in and weight out) of each of such test lot and the amount of feed consumed by the cattle during such test, and that the average cost per pound using the apparatus 10 herein above described was only 16.8 cents per pound as against 20.2 cents per pound in the control lot, and 17.9 cents per pound using the apparatus 110.

Figure 6:
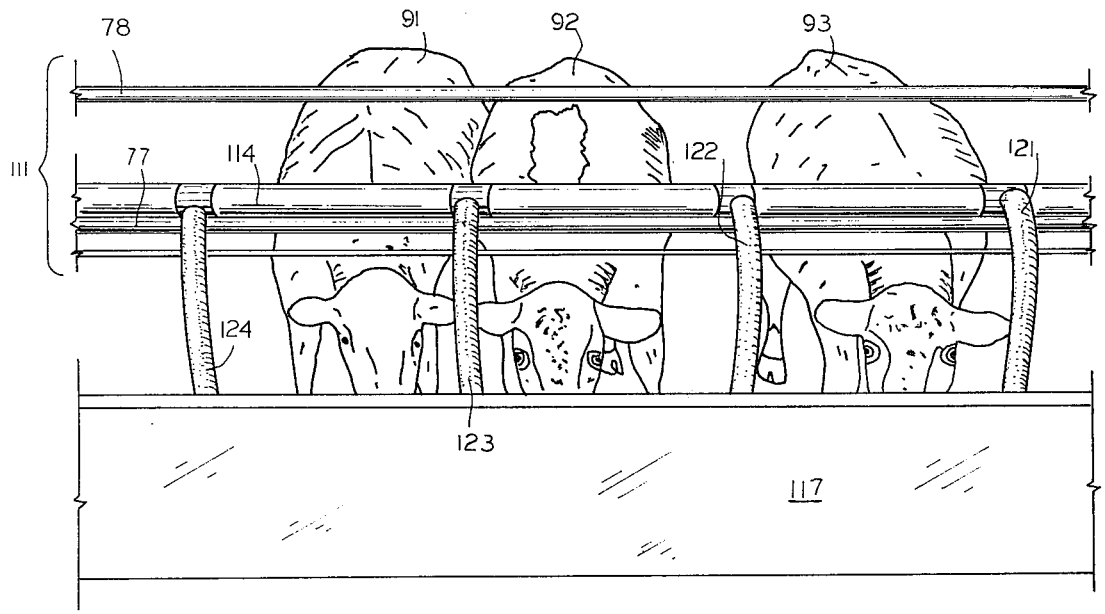
FIG. 6 is a frontal view of the apparatus shown in FIG. 2 in zone 6A thereof.
Figure 8:
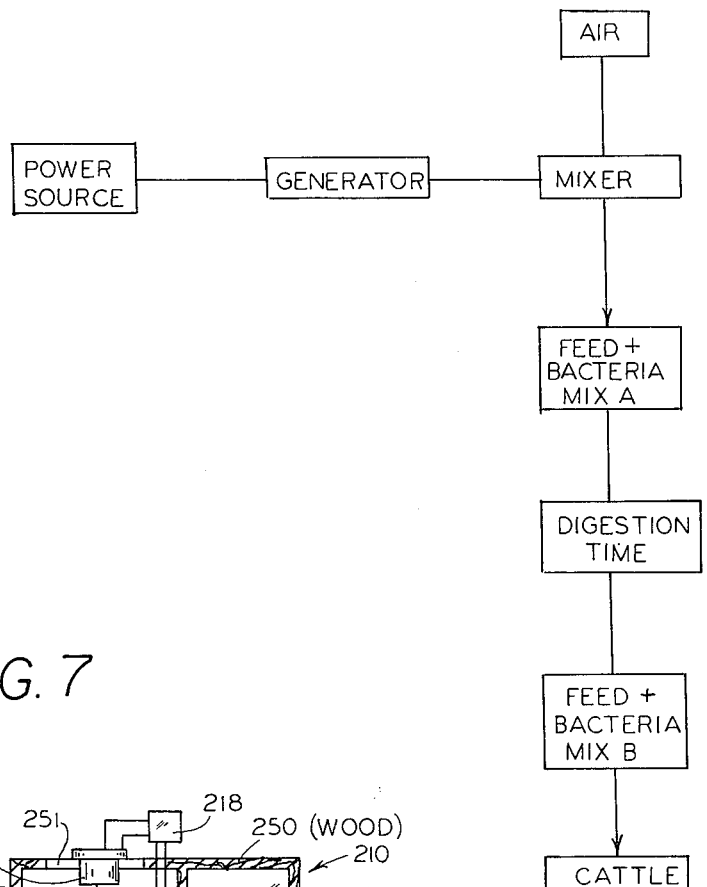
FIG. 8 diagrammatically illustrates the process of this invention.

Troughs as 17 and 117 of pens 28, 29, and 30 were filled within 10 minutes of each other during the daily refillings thereof as they were in series (28, 29, 30) along the feedlot aisle 40. As shown in FIGS. 1, 2, and 6 of the drawings, such troughs are open to the air.

The ionization of the air provided by the corona discharge in the chamber 85 provides ionized particles and it is believed that such particles pass to the feed 36 and to the animals while eating such feed and accordingly provide the herein above described benefit to the convention.

The gases which pass out of the orifice as 69A when applied to moist pH paper of range from pH 1 to pH of 12, change the color thereof to a yellow color corresponding to pH of 8 (green color corresponds to pH of 5). The water used to moisten the paper has, measured by the same pH paper, a pH of 7.0.

The above ends the description of the apparatus and its operation referred to in the said application of Don L. Brunton.

The feed 36 is a standard feed of milo in principal amount (Happy Wheat Growers Inc. feed lot, lot No. 21-4-70, report of AUG. 4, 1970) with a composition as shown in Table II herebelow.

TABLE II

FEED COMPOSITION AND ANALYSIS, UNTREATED

| Ingredient & Per cent Ingredient [a] | Analysis of Composition [b] | | | | | | |
|---|---|---|---|---|---|---|---|
| | | Protein | | Energy per lb | | | |
| | Dry Matter | Total N×6.25 | Digestible | lb Digestible | TDN | Fat | Fiber |
| Milo | 79 | 89 | 11.0 | 9.0 | 1420 | 79 | 2.5 | 2.5 |
| Silage | 7 | 29 | 2.3 | 0.6 | 303 | 17 | 0.8 | 7.8 |
| Premix | 3 | — | — | — | — | — | — | — |
| Alfalfa | 2 | 30 | 5.3 | 3.4 | 360 | 18 | 1.1 | 9.1 |
| Molasses [c] | 5 | — | — | 1.0 | — | 72 | — | — |

TABLE II-continued

FEED COMPOSITION AND ANALYSIS, UNTREATED

| Ingredient & Per cent Ingredient [a] | Dry Matter | Protein Total N×6.25 | Analysis of Composition [b] Digestible | Energy per lb Digestible | TDN | Fat | Fiber |
|---|---|---|---|---|---|---|---|
| Fat | 2 | — | — | — | — | 2.0 | — |
| Cottonseed Meal | 2 | 93 | 41.4 | 33.5 | 1460 | 73 | 5.8 | 10.7 |

[a] Standard composition used by Happy Wheat Growers, contains 12.7% crude protein.
[b] Nutrient Requirements of Beef Cattle, National Academy of Sciences--National Research Council, publication 1137, Washington D.C. 1963, pp. 19-24.
[c] See Crampton, Applied Animal Nutrition, Freeman and Co., 1956, p. 442.

Figure 7:
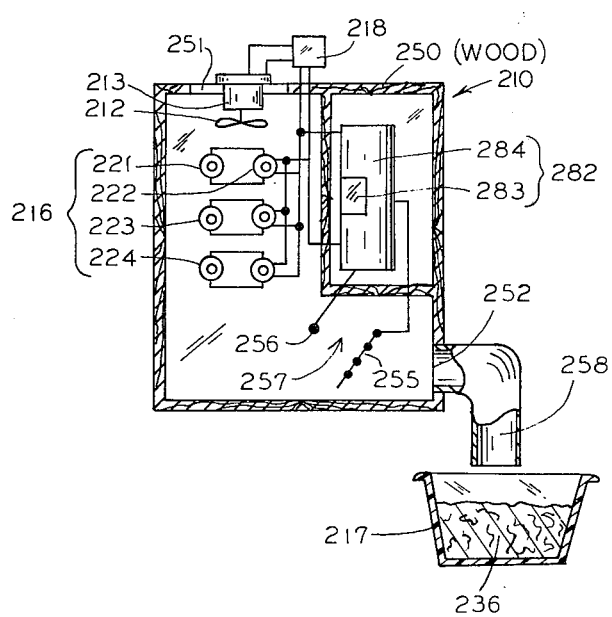
FIG. 7 shown another combination of apparatus for use in the process of this invention.

Other apparatus than 10 and 110 hereinabove described may be used to provide the gas discharge to the feed e.g. the apparatus disclosed in U.S. Pat. Nos. 2,867,573 or 3,320,151. A machine to produce such action in accordance with this invention is also shown in FIG. 7.

Selected analyses were made of the gas at various points in the operation thereof and determination was made as follows as set out in Table III.

Additionally, tests of the feed so treated by apparatus 10 and 110 were made and the results thereof are set out in Table IV.

TABLE III

GAS ANALYSES OF APPARATUS 10 and 110

| Component | Sample Number 1 | 2 | 3 | 4 | 5 | 6 |
|---|---|---|---|---|---|---|
| Carbon Dioxide | .31 | .45 | .52 | .56 | .63 | .69 |
| Argon | .89 | .87 | .89 | .89 | .89 | .89 |
| Oxygen | 21.40 | 21.2 | 21.53 | 21.27 | 21.25 | 21.16 |
| Nitrogen | 74.81< | 75.4< | 75.81< | 76.19< | 76.33< | 76.23< |
| Water Vapor | 2.56 | 1.98 | 1.22 | 1.06 | .88 | 1.01 |
| Ozone | <.021 | <.018 | <.019 | <.021 | <.016 | <.017 |
| Nitrogen Dioxide | <.0005 | <.0005 | <.0005 | <.0005 | <.0005 | <.0008 |
| Nitrous Oxide | <.001 | <.001 | <.001 | <.0010 | <.001 | <.001 |
| Nitric Oxide | <.001 | <.001 | <.001 | <.0010 | <.001 | <.001 |

Legend for Table III:
1. At inlet to fan of 110
2. In 158, near 169
3. Exterior of 169
4, 6. At outlet of 59D
5. At inlet to fan of 10

The instrument used for these measurements was: Consolidated Electrodynamics Corp., model 21-103C, Mass spectrometer.

The method of calculation was by the Mass Spectrometry Computing Manual, published by Consolidated Electrodynamics Corporation, approved by American Society of Mass Spectrometry, for model 21-103C.

TABLE IV

Treated Feed Analysis

| Component | Sample No. No. 7 As Is | Air Dry | No. 8 As Is | Air Dry | No. 9 As Is | Air Dry | No. 10 As Is | Air Dry | No. 11 As Is | Air Dry | No. 12 As Is | Air Dry |
|---|---|---|---|---|---|---|---|---|---|---|---|---|
| Nitrogen, total | 1.74% | 1.88% | 1.74% | 1.88% | 1.78% | 1.91% | 1.72% | 1.88% | 1.85% | 1.92% | 1.77% | 1.89% |
| Moisture, total | 16.84% | 10.00% | 16.50% | 10.00% | 16.08% | 10.00% | 17.74% | 10.00% | 13.30% | 10.00% | 15.62% | 10.00% |
| Nitrates, ppm | 150 | 162 | 150 | 162 | 350 | 375 | 300 | 328 | 100 | 104 | 50 | 53 |
| Nitrites, ppm | 5.79 | 6.27 | 5.79 | 6.24 | 5.53 | 5.93 | 6.05 | 6.62 | 5.53 | 5.74 | 6.84 | 7.30 |
| Combined as Nitrates, ppm | 228 | 247 | 228 | 246 | 424 | 455 | 381 | 417 | 174 | 181 | 142 | 151 |
| Free Moisture | 0 | | 0.50% | | 0.42% | | 0.88% | | 0.52% | | 0.62% | |
| Bound Moisture | 16.88% | | 16.00% | | 15.66% | | 16.86% | | 12.78% | | 15.00% | |
| pH | 5.6 | | 5.6 | | 5.4 | | 5.5 | | 5.7 | | 5.5 | |

Legend for Table IV:
COMPONENTS:
Nitrogen, total
   American Oil Chemists' Society, Ba-4-38
Moisture, total
   American Oil Chemists' Society, Ba-2-38
Nitrates, ppm
   Analytical Chemistry
   Vol.26, p. 1081, 1965

TABLE IV-continued

| | Treated Feed Analysis Sample No. | | | | | |
|---|---|---|---|---|---|---|
| Component | No. 7 | No. 8 | No. 9 | No. 10 | No. 11 | No. 12 |

Nelson Kuntz and Brag
Nitrites, ppm
   Standard Method for Examination of Water and Waste Water
   American Public Health Association
Combined as Nitrates, ppm
   is a toxilogical figure according to Frank F. Densmore D.V.M.
   "The Vetinarian" Pitman and Moore Co.
   (Dow Chemical Co.) Vol. 37, July-August 1965, pp. 114–117
Bound Moisture
   Associations of Official Analytical Chemists
   1965, 10th ed., 22,004
pH
   10 to one wash
SOURCE OF SAMPLES:
Samples 7, 8    Trough 117    pen 29
Samples 9, 10    Trough 17    pen 28
Samples 11, 12    Control    pen 30
All samples were tested 4 days after taken at test site.

A close observation of the cattle fed by apparatus 10 and 110 was made and it was discovered that the animals consume their feed at the greatest rate when the food is freshly added to the trough and the cattle thereafter avoid the trough except to feed and cattle when feeding located themselves as shown in the Figures usually at some distance from the gas discharge of the trough.

In the pens, as shown in FIGS. 1 and 2 the animals are free to roam; however it was noted that except when the animals were feeding they would locate themselves at some substantial distance, e.g. 50 to 150 feet from the trough as 17 and lie down or stand at a position in the pen that was accordingly substantially removed from the trough in the case of the lots in pens 28 and 29, although a salt block as 38 was placed in the feed trough 117 and 17 to encourage the animals to come to the trough while there was a more random grouping of the animals in the test pen.

Further, the cattle, as 91, 92, 93, when they did eat, were locating themselves as shown in FIG. 6 with their noses and heads located at a point substantially removed from the discharge nozzles, that is, the animals did not feed close to the gas discharge nozzles as 169 but rather located themselves far from the outlet or nozzle as 169 as possible while eating the feed from the trough as though they found the odor unattractive.

Accordingly, it was discovered that nitrates developed in the feed providing improved feed conversion due to the treatment thereof by the gas fed thereinto through the apparatus 10 and 110 was proportionate to the amount of improved conversion although no nitrogen oxide gas was detectable in the discharge from nozzles as 69D and 169.

On the basis of such discovery, it was hypothesized that such nitrate inhibited certain bacterial species in the grain that would act as a drain on the convertability of the feed, and also that the animals found the gas discharge unattractive although it was only a very mild breeze. Accordingly, an apparatus was used for treatment of the feed (apparatus as in FIG. 7) to change the chemical behavior of the cattle feed.

According to this process, the amount of nitric oxides developed in the feed as 281 to 367 p.p.m. thereof is effectively controlled to obtain an effective yet nonnoxious content.

While the subject invention is directed to producing enough nitrogen oxide in the feed to inhibit bacterial action as that of *clostridia* in sufficient amount to improve the digestibility of feed grains and conversion thereof to meat, the amount of such nitric oxides developed should not exceed known harmful limits, as 2,500 parts per million.

Further still the production of nitric oxides is effective over all of the feed ingested by the animals fed thereby to better perform the desired effect of improved conversion by a delay between initiation of the treatment of the feed and its ingestion because the feed is treated sufficiently prior to its addition to the trough to develop nitrate in feed and, thereby, ingestion by the cattle of untreated feed is avoided.

The apparatus 210 of FIG. 7 comprises a closed rigid box 250 and a conduit 258 and a container 217. A bank 216 of lamps, a fan 213 and a high voltage generator are located in the box in operative connection therewith.

The box 250 is a rigid air-tight closed container except for an inlet opening 251 and an outlet opening 252. A fan 213 is supported before opening 212 and is operatively connected to and driven by a motor 212. Motor 212 is a fractional horsepower motor (about one-twenty-fifth HP) firmly fixed to the base of box 250 and is operatively connected to a 110 volt power source 218.

A plurality of germicidal bulbs (General Electric G45-11, 4 watt) are located in the path of the air stream and exposed thereto (as in 183). A transformer 282 (Model 9T61Y3024C, 32 VA) with a secondary coil 284 producing 7,500 volts at 0.30 milliamperes is also operatively connected to power source 218 and its output is connected to an open metallic grid 255 of one-half inch square opening and a thin wire electrode 256 with a gap 257 therebetween.

The bank of germicidal bulbs are mercury vapor lamps that, like 183, produce ultraviolet radiation in the range of 1,849 A (Angstrom units).

Pan 217 is a plastic pan of 12 inches diameter and about 4 inches height at its rim. It is open at its top. Feed 236, identical in composition to feed 36, is located therein to a uniform depth of 1 inch. A plastic duct 258 extends from the orifice 252 and is located with its discharge about 1 inch above the top of the feed mass 236. Plastic duct 258 is made of electrically insulating material as is duct 14. In operation fan 212, powered by motor 213, drives air over the bank of bulbs 216 and through the gap 257 whereat a corona discharge is produced and, via the duct 258 into the mass of feed 236 in a pan 217. The action of this apparatus 210, as 10 and 110, serves to provide a similar oxidizing action on the feed treated thereby.

In the operation of the apparatus 210 to illustrate the process of this invention a test sample of the feed 236 was treated by passing the air into the gas discharge of the operating apparatus 210 operating as above described. The resulting feed after such treatment for 8 hours was distinctly odor-free. It did not have the odor of a similar sample of the same size, shape, and initial composition chosen from the same source of feed sample as 236 that was not so treated but was merely left open to the air in a similar pan, i.e. a pan similar to 217. A pan of the untreated feed has an odor which is pungent and distinguishable from the feed in the pan 217 which had been treated. Additionally a day after treatment of the sample 217 had been stopped the container of feed that had not been treated by such gaseous discharge of apparatus 210 did have a strong pungent odor while the feed sample 236, which had earlier been treated by the gas discharge, still did not have any such odor.

Additionally, the samples of the feed were washed with water (of pH=7) and the pH thereof tested by pH paper. Immediately after the treatment of the sample 236 the feed that had been treated with the gas discharge of apparatus 210 had a distinctly lower pH (value of 7.0) than the wash water used to wash the feed sample that had not been so treated; such wash water used to wash the feed sample that had been not so treated had a pH of abouot 7.6.

After sitting in air at ambient temperature of about 80°F. for the full day the sample of feed that had been treated by the apparatus 210, or washing with water (of pH=7), had a pH of about 6.5 while the pH of the feed sample that was not treated by the apparatus 210 had a pH of 7.0.

Further still the feed 236 which had been treated by the discharge of the apparatus as 210 continued to not have any odor two days after the treatment of the feed by apparatus 210 had been completed while the feed that had not been so treated continued to have its strong and pungent odor.

The absence of odor as taken as a difference in bacterial action between that in the feed treated by apparatus 210 and that bacterial action in the feed not so treated.

The different in chemical composition of feed treated by apparatus as 210 is illustrated in Table V.

The absence of odor was taken as a different in bacterial action between that in the feed treated by apparatus 210 and that bacterial action in the feed not so treated.

The difference in bacteriological composition of feed (of Table II) by the above described treatment is set out in Table VI. The colony description of flora in Table VI is set out in Table VII.

The plating technique for the data of Table VI and VII is as follows:

1.0 gram of each feed sample was dispersed in tryptose phosphate broth, then plated on trypticase soy agar with 5% defibrinated sheep blood. After 24 hour incubation at 37°C, plate counts were taken and individual colonies isolated to nutrient agar slants.

Gram negative rods were then transferred to EMB (eosine methylene Blue agar) to test for enteric pathogens. No distinct non-lactose fermentors were found (so the feed is free from Salmonella and Shigella).

The characterization of the organism types A, $C_2$, and E showing change by the above described treatment are graphically set out in Table VIII and were as follows:

A Bacillus — gram negative rods forming slimy, irregularly, rapidly spreading colonies at 37° on blood agar in 24 hours, growth on nutrient agar poor; large ovoid terminal spores; motility positive by hanging drop slide test, flagella peritrichous by flagella stain; triply sugar iron agar: acid slant, no $H_2S$; methyl red/Voges-Proskauer negative; does not utilize mannitol, or urea, or citrate; catalase positive.

$C_2$ Micrococcus — gram positive cocci forming raised, crustose, "volcano-shaped" colonies on blood agar or nutrient agar in 24 hours; non-motile by hanging-drop slide test; no spores; triple sugar iron agar: acid slant, no $H_2S$; methyl-red/Voges-Proskauer negative; utilizes mannitol weakly, urea strongly; catalase positive; good growth on Staph. 110 agar; geltinase positive by ammonium hydroxide test.

E Streptococcus — gram positive cocci, growing slowly on blood agar or nutrient agar, forming slimy, round, yellow-gray colonies; no spores; non-motile by hanging drop slide test; triple-sugar iron agar: acid slant.

As tabulated in Table VIII and above described the process of this invention selectively decreases the bacteria that ferment urea and accordingly avoid destroying a particularly critical metabolizable feed constituent for cattle. The selectivity of the treatment is illustrated by the observation of Tables VI, VII and VIII that some bacterial flora of the feed were relatively unchanged or demonstrated change only over a long period, e.g. colonies as A and B, while some (as I, J and K) increased then decreased, while rapidly occurring significant changes occurred with colonites $C_2$ and E.

The process of this invention accordingly provides for selective removal of urea fermenting bacteria: it also shows an increase in feed conversion may be obtained by substituting feed so treated for the present long standing wasteful practice of transporting feeder cattle to regions of intense ultraviolet radiation and high ozone content found at elevation of 3,000 feet above sea level in relatively arid regions for finishing feeding.

TABLE V

| Material Sample No. | CHEMICAL COMPOSITION CHANGES ON FEED TREATMENT Feed Mixture | | | | |
|---|---|---|---|---|---|
| | 5 | 4 | 3 | 2 | 1 |
| Treatment in Apparatus 210 | Control | Air Only | Air + High Voltage | Air + Ozone Lamp | Air + High Voltage + Ozone |
| | As Is/Air Dry | As Is/Air Dry | As Is/Air Dry | As Is/Air Dry | As Is/Air Dry |
| Moisture | 15.46/10.00 | 11.22/10 | 12/10 | 13.2/10 | 17.34/10 |
| Nitrate P.P.M. | 0/0 | 0/0 | 100/102 | 100/104 | 200/209 |
| Nitrites P.P.M. | 3.95/4.21 | 5.57/5.61 | 5.53/5.66 | 4.74/4.92 | 6.05/6.28 |
| Combined as $NO_3$ P.P.M. | 53/56 | 74/75 | 174/178 | 163/169 | 281/292 |

TABLE V-continued

CHEMICAL COMPOSITION CHANGES ON FEED TREATMENT

| Material Sample No. | 5 | 4 | 3 | 2 | 1 |
|---|---|---|---|---|---|
| Material | | Silage | Milo | | Whole* |
| Sample No. Treatment in Apparatus 210 | | 3 hr. | None | | 5 hr. |
| | | As Is/Air Dry | As Is/Air Dry | | As Is/Air Dry |
| Moisture | | 60.12/10.00 | 73.32/10 | | 11.28/10.0 |
| Nitrate P.P.M. | | 2250/5078 | 850/2867 | | 0/0 |
| Nitrites P.P.M. | | 4.50/10.16 | 2.11/7.12 | | 3.42/3.47 |
| Combined as $NO_3$ P.P.M. | | 2310/5213 | 878/2962 | | 46/47 |
| Protein | | 2.26/8.79 | 2.54/8.55 | | 6.81/6.91 |

*Milo in feed tested was flaked.

TABLE VI

FLORA CHANGES BY TREATMENT OF FEED, PERCENT OF TOTAL FLORA POPULATION

| Sample No. | Δ* | 1 A Treated 3 hr. | 2 A Control | E B Treated 12 hr. | F B Control | 4 B 3½ hr. at 43° F. 203 PPM $NO_3$ | 5 B 3½ hr. 65-70° F. 367 PPM $NO_3$ |
|---|---|---|---|---|---|---|---|
| N** | | $1.13 \times 10^3$ | $1.55 \times 10^3$ | $1.14 \times 10^6$ | $2.3 \times 10^8$ | $1.51 \times 10^7$ | $2.2 \times 10^1$ |
| A | > | 5 | 4 | 16.3 | .1 | .7 | 3.1 |
| B | > | 14 | 11 | .1 | <.1 | .1 | 1.4 |
| $C_1$ | | | | 0 | 0 | 0 | 0 |
| $C_1$ + D | 0 | 38 | 39 | 25.7 | 30.3 | 27.7 | |
| $C_2$ | << | 0 | 21 | 0 | 5.8 | .2 | 1. |
| $C_3$ | ~ | | | 1.3 | 10.9 | .1 | 7.3 |
| E | >> | 24 | 0 | 55.8 | 4.5 | 2.1 | 2.6 |
| F | | 0 | 11 | 0 | 0 | 0 | 0 |
| G | > | 19 | 14 | .5 | .1 | .4 | 11 |
| H | | | | .1 | <.1 | <.1 | .1 |
| I | < | | | 0 | 48.4 | 62.8 | 68.1 |
| J | ~ | | | 0 | 0 | .6 | 0 |
| K | ~ | | | 0 | 0 | 5.2 | 0 |
| Source | | Flaked Milo & Barley | | Happy Feed Lot Ration (Analysis in Table II) | | | |

N** = Total number of cells per gram dry weight
Δ* (Change) > = Small increase < = Small decrease >> = Large increase << = Large decrease

TABLE VII

COLONY DESCRIPTIONS

A. Small, single gram negative rods; grayish, shiny, flat, irregular colonies.
B. Single gram negative rods; α-hemolytic, crustose, elevated, white/yellow, irregular colonies.
$C_1$ Round, shiny, white, convex, (yellow center when old) colonies.
$C_2$ Gram positive cocci; small, slow-growing, crustose, yellow, irregular colonies.
$C_3$ Small, white, dull, irregular, "volcano-shaped" colonies.
D. Gram negative rods, possibly in strings; greyish-white, round, shiny colonies when young — smooth unshiny colonies with recessed edge when old.
E. Cocci; small, round, yellow, shiny colonies (a few irregularly shaped).
F. Mold, rapidly growing, white mycelia.
G. Gram negative rods; grayish, flat, shiny colonies, irregular with mottled growth. Maybe B.
H. Large, pale green colonies, flat, dull, α-hemolytic.
I. Small, white, round, shiny, α-hemolytic colonies.
J. Yellow-orange, flat, dry, yeast-like, slightly peaked in middle colonies.
K. Yellow-green, shiny, flat colonies, α-hemolytic ring with β-hemolytic outer ring.

TABLE VIII

BIOCHEMICAL CHARACTERISTICS OF CHANGED FLORA

| Change by Treatment* | > | >> | << |
|---|---|---|---|
| Flora | A | E | $C_2$ |
| Gram | — | + | + |
| Motility | + | 0 | 0 |
| Agar Nutrient | Poor | Slow | Good |
| Agar Blood | Good | Slow | Good |
| Spores | + | 0 | 0 |
| Triple Sugar Iron Agar | + | + | + |
| $H_2S$ | 0 | 0 | 0 |
| Methyl Red** | — | + | — |
| Voges Proskauer** | — | — | — |
| Catalase | + | — | + |
| Mannitol | 0 | + | Weak |

TABLE VIII-continued

| BIOCHEMICAL CHARACTERISTICS OF CHANGED FLORA | | | |
|---|---|---|---|
| Urea | 0 | 0 | Strong |

LEGEND
*< = Increase Slightly
>>= Increase Greatly
<<= Decrease Greatly
< = Decrease Slightly
**As in The Principles of Bacteriology and Immunity - Topley and Wilson - The Williams & Wilkins Company - Baltimore - 1941 Page 259

I claim:

1. Process of treating and feeding a cattle feed composition comprising a mixture of grain in bulk and silage and bacteria, which process comprises the steps of continuously
   a. passing air into an air treatment zone at which zone said air is subjected to ultraviolet radiation and a high voltage electric field and producing ionized particles in said zone and discharging the resulting gases from said zone; and
   b. supporting said feed composition in a receptacle having a top opening exposed to air and to the discharge from said air treatment zone, said feed composition in a mass having an upwardly facing surface exposed to air and to the discharge from said air treatment zone, and
   c. passing said resultant gases into contact with said feed composition said receptacle and continuously treating said mixture of grain, silage and bacteria with said resultant gas over a period of several hours in said receptacle, wherein said treated mixture of grain, silage and bacteria is available for consumption by cattle and said receptacle is spaced away from said first air treatment zone sufficiently to permit cattle to feed on said feed composition in said receptacle and there feeding cattle on said thus treated composition in said receptacle during said period of treating of said mixture by said resultant gas, said treatment of said mixture by said resultant gas being continuous over a period of several hours, and changing the bacterial population of said mixture and developing in said mixture nitric oxide in amount between 163 p.p.m. and 367 p.p.m. of said mixture and selectively removing all urea fermenting bacteria from said mixture while retaining other bacterial flora therein.

2. Process as in claim 1 wherein said treatment of said cattle feed composition by said resultant gas continues while said cattle feed on said feed composition.

3. Process as in claim 2 wherein said discharge from said gas treating zone passes through air for a distance of 8 to 16 inches to said feed composition in said receptacle.

4. Process as in claim 3 wherein said process of treating said mixture by said resultant gas continues over a period of 8 hours.

5. Process as in claim 4 wherein said high voltage electric field is an electric field of 15,000 volts.

* * * * *